US012757130B2

(12) United States Patent
Guo

(10) Patent No.: US 12,757,130 B2
(45) Date of Patent: Oct. 6, 2026

(54) DISTRIBUTED DIRECTIONAL ELECTROMAGNETIC FIELD POWER BACK-OFF FRAMEWORK WITH OPEN RADIO ACCESS NETWORK COMPLIANCE

(71) Applicant: Telefonaktiebolaget LM Ericsson (publ), Stockholm (SE)

(72) Inventor: Shiguang Guo, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 329 days.

(21) Appl. No.: 18/564,878

(22) PCT Filed: Jun. 7, 2021

(86) PCT No.: PCT/IB2021/054979

§ 371 (c)(1),
(2) Date: Nov. 28, 2023

(87) PCT Pub. No.: WO2022/259011

PCT Pub. Date: Dec. 15, 2022

(65) Prior Publication Data

US 2024/0292344 A1 Aug. 29, 2024

(51) Int. Cl.
*H04W 52/36* (2009.01)

(52) U.S. Cl.
CPC ................................ *H04W 52/367* (2013.01)

(58) Field of Classification Search
None
See application file for complete search history.

(56) References Cited

U.S. PATENT DOCUMENTS 11,064,443 B1 * 7/2021 Lin .................... H04W 52/225
2016/0173180 A1 6/2016 Cheng et al.

FOREIGN PATENT DOCUMENTS

EP 4550043 A1 * 5/2025 .......... G02F 1/3551
WO 2019/194719 A1 10/2019
WO 2019/194721 A1 10/2019
WO 2020/073191 A1 4/2020

(Continued)

OTHER PUBLICATIONS

Linda Hardesty, "What is eCPRI, and why is it important for 5G and open vRAN?" Oct. 15, 2019, consisting of 3 pages.

(Continued)

*Primary Examiner* — Walter J Divito
(74) *Attorney, Agent, or Firm* — Weisberg I.P. Law, P.A.

(57) ABSTRACT

A method, radio unit (RU) and digital unit (DU) for distributed directional electromagnetic field (EMF) power back-off framework with open radio access network (ORAN) are provided. According to one aspect, a method in a DU includes, for each of a plurality of transmission time intervals and for each wireless device (WD), mapping a transmission intended for the WD to a sector encompassing the WD. The method includes, for each of a plurality of control step intervals and for each of a plurality of directions: receiving an estimated time-average power from the radio unit; and comparing the received estimated time-average power to a threshold corresponding to the direction. The method also includes applying power scaling during a control step interval.

20 Claims, 20 Drawing Sheets

(56) References Cited

FOREIGN PATENT DOCUMENTS

WO 2020/111987 A1 6/2020

OTHER PUBLICATIONS

O-Ran Alliance e.V., O-RAN.WG4.MP.0-v05.00 "Management Plane Specification"; O-RAN Alliance Working Group 4; Copyright 2021, consisting of 202 pages.

International Search Report and Written Opinion dated Mar. 2, 2022 issued in PCT Application No. PCT/IB2021/054979 filed Jun. 7, 2021, consisting of 17 pages.

3GPP TS 38.214 V15.0.0 (Dec. 2017) 3rd Generation Partnership Project; Technical Specification Group Radio Access Network; NR; Physical layer procedures for data (Release 15), consisting of 71 pages.

3GPP TS 36.213 V13.6.0 (Jun. 2017) 3rd Generation Partnership Project; Technical Specification Group Radio Access Network; Evolved Universal Terrestrial Radio Access (E-UTRA); Physical layer procedures (Release 13), consisting of 390 pages.

* cited by examiner

--PRIOR ART--

--PRIOR ART--

--PRIOR ART--

--PRIOR ART--

--PRIOR ART--

--PRIOR ART--

--PRIOR ART--

--PRIOR ART--

--PRIOR ART--

--PRIOR ART--

--PRIOR ART--

DISTRIBUTED DIRECTIONAL ELECTROMAGNETIC FIELD POWER BACK-OFF FRAMEWORK WITH OPEN RADIO ACCESS NETWORK COMPLIANCE

CROSS-REFERENCE TO RELATED APPLICATION

This application is a Submission Under 35 U.S.C. § 371 for U.S. National Stage Patent Application of International Application Number: PCT/IB2021/054979, filed Jun. 7, 2023 entitled "DISTRIBUTED DIRECTIONAL ELECTROMAGNETIC FIELD POWER BACK-OFF FRAMEWORK WITH OPEN RADIO ACCESS NETWORK COMPLIANCE," the entirety of which is incorporated herein by reference.

TECHNICAL FIELD

The present disclosure is related to wireless communication, and in particular to distributed directional electromagnetic field (EMF) power back off framework with open radio access network (ORAN).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Active antenna systems (AAS) are one of several key technologies adopted by the 3GPP for 4G LTE and 5G NR to enhance the wireless network performance and capacity by using full dimension multiple input multiple output (FD-MIMO) or massive MIMO. A typical AAS consists of two-dimensional antenna elements array with M rows, N columns and K polarizations (K=2 in case of cross-polarization) as shown in FIG. 1.

The codebook-based precoding in AAS is based on a set of pre-defined precoding matrices. The precoding matrix indicator (PMI) may be selected by the WD with a channel state information reference signal (CSI-RS), or by the network node (base station, eNB, gNB) with uplink (UL) reference signals.

The precoding matrix, denoted as W, may be further described as a two-stage precoding structure as follows:

$$W = W_1 W_2.$$

The first stage of the precoding structure, i.e., $W_1$, may be described as a codebook, and consists essentially of a group of 2-dimensional (2D) grids-of-beams (GoB), which may be characterized as:

$$W_1 = \begin{bmatrix} w_h \otimes w_v & 0 \\ 0 & w_h \otimes w_v \end{bmatrix}$$

where $w_h$ and $w_v$ are precoding vectors selected from an over-sampled discrete Fourier transform (DFT) for the horizontal direction and the vertical direction, respectively, and may be expressed by:

$$w_v = \frac{1}{\sqrt{M}}\left[1, e^{\frac{j2\pi v}{MO_1}}, \ldots, e^{\frac{j2\pi mv}{MO_1}}, \ldots, e^{\frac{j2\pi(M-1)v}{MO_1}}\right]^T$$

$$w_h = \frac{1}{\sqrt{N}}\left[1, e^{\frac{j2\pi h}{NO_2}}, \ldots, e^{\frac{j2\pi nv}{NO_2}}, \ldots, e^{\frac{j2\pi(N-1)h}{NO_2}}\right]^T$$

where $O_1$ and $O_2$ are the over-sampling rate in vertical and horizontal directions, respectively.

The second stage of the precoding matrix, i.e., $W_2$, is used for beam selection within the group of 2D GoB as well as the associated co-phasing between two polarizations.

In NR, $W_1$ is determined according to a WD PMI report of i1. $W_2$ is determined according to a WD PMI report of i2. The WD will feed back PMI to the network node and the network node will apply a corresponding precoder for the transmission after receiving the WD feedback.

Beamforming is a technique by which an array of transmit antennas can be utilized to focus the radiated energy in a specific target direction and/or reduce the radiated energy in other directions. Instead of simply broadcasting the transmitted signals in all directions, the antenna arrays that use beamforming determine a direction of interest and form a stronger beam in this direction. This is achieved by feeding the signal to be transmitted to each antenna element and controlling the phase and amplitude of each element separately such that the signals from different elements add constructively in the direction of interest and destructively at the nulling directions.

A two-dimensional polarized array is considered, where $M_V$ and $M_H$ denote the number of rows and columns of the 2-dimensional antenna array, respectively, i.e., the total number of antenna elements is given by $2M_VM_H$. Let $S_{i,k}(t)$ denote the information signal that should be transmitted by the antenna array in the k-th layer of the i-th WD. Transmit beamforming is applied by using the $2M_VM_H \times 1$ beamforming vector $w_{i,k}(t)$ where the transmitted signal vector $x_i(t)$ from the antenna array elements intended for the i-th WD at time t is represented as:

$$x_i(t) = \sum_{k=1}^{N_L} w_{i,k}(t)\, s_{i,k}(t)$$

where $N_L$ is the number of transmission layers. Let $M_R$ denote the number of receive antennas at the WD and let $H_i(t)$ denote the $M_R \times 2M_VM_H$ channel matrix from the base station to the i-th WD where $M_R$ is the number of antenna elements at the WD. The $M_R \times 1$ received signal vector at the WD is given by:

$$y_i(t) = H_i(t) \sum_{k=1}^{N_L} w_{i,k}(t)\, s_{i,k}(t) + n_i(t)$$

where $n_i(t)$ is the interference-plus noise vector received at the WD.

In 4G and 5G communication systems, the WD can be configured to perform measurements on the downlink received signal quality and submit these measurement reports to the base station. With multi-antenna transmission capability at the network node (base station), the measurement report includes a precoder matrix indicator (PMI) indicating what the device believes is a suitable precoder (beamforming) matrix. The set of possible PMI values that the device can select from when reporting PMI corresponds to a set of corresponding different precoder matrices. This set is referred to as the precoder codebook. The codebook is defined based on the number of available transmission ports, $N_T$ and the number of transmission layers $N_L$. There is at least one codebook for each valid combination of $N_T$ and $N_L$.

Reciprocity-aided transmission (RAT) beamforming assumes that the downlink channel is reciprocal to the uplink channel, i.e., the downlink channel vector $H_i(t)$ can be estimated from the uplink reference symbols that are transmitted by the WD. Given the estimate $\hat{H}_i(t)$ of the downlink channel, the full rank beamforming matrix for the i-th WD can be selected based on the minimum mean square error criterion as:

$$W_i(t) = \left[w_{i,1}(t) \ldots w_{i,N_R}(t)\right] = \hat{H}_i^H(t)\left(\hat{H}_i(t)\hat{H}_i^H(t) + \Gamma I_{N_R}\right)^{-1}$$

where $(\cdot)^H$ denotes the Hermitian transpose operator, $\Gamma$ is a regularization factor, and $I_{N_R}$ is the $N_R \times N_R$ identity matrix.

When any radio equipment is to be deployed, regulatory radio frequency (RF) exposure regulations need to be accounted for. These exposure limitations are typically based on the guidelines from the International Commission on Non-Ionizing Radiation Protection (ICNIRP) but may take different forms in some countries and regions. The aim of the RF exposure regulations is to ensure that human exposure to RF energy is kept within safe limits. These limits have been set with wide safety margins.

The RF exposure limitations become more important when new 4G/5G base stations and radios are equipped with advanced antenna systems (AAS). These AASs increase the capacity and/or coverage by addition of an antenna array that increases the beamforming gain significantly. The consequence is a concentration of the radiated power into beams. As a further consequence, the traditionally used methods for calculation of safety distances and exclusion zones based on the maximum Equivalent Isotropically Radiated Power (EIRP) of the node, tend to generate significantly increased safety distances and exclusion zones. This increases the deployment challenges, which is why operators are requesting functionality for reduction of safety distances and exclusion zones, while strictly maintaining compliance with RF exposure regulations.

More specifically, the ICNIRP and other RF exposure limitations are expressed as the average power density over a specified time interval T. This power averaging opens a possibility for the requested reductions. For a given distance, the power density limit can be transformed to a corresponding power limit for the average total transmitted power. Thus, the momentary power can be significantly higher than the limit during shorter times than T. However, the transmitted average power must then be guaranteed to be below the limit, typically obtained from the calculation of a reduced exclusion zone. Thus, to be allowed to use a safety distance that is shorter than what is obtained using the maximum EIRP of the AAS equipped node, control functionality is needed that guarantees that the average power is below the limit 100% of the time.

An obvious consequence of the introduction of AAS is that the size of the RF EMF compliance boundary increases when the beamforming gain increases, and no time-averaging is taken into account. Such increased compliance boundary could make deployment challenging in dense urban environments, for example. Operators are requesting functionality that can reduce the time-averaged power (or EIRP) levels to a pre-determined level needed to obtain a certain compliance boundary, with minimum impact on the capacity and coverage of the served cell.

As shown in the example of FIG. 2, safety distance for both general public and workers is specified to ensure health and safety.

Open Radio Access Network (ORAN) is an international collaboration to allow mobile operators to use open digital unit (O-DU) and open radio unit (O-RU) from different vendors. O-DU refers to an ORAN compatible DU. O-RU refers to an ORAN compatible radio such as AAS. ORAN provides benefits for operators to deploy networks. One benefit is the possibility to optimize the cost structure by deploying DUs or AASs from different vendors so that the operator does not need to find a single vendor for both DU and AAS.

To enable O-DU and O-RU from different vendors work together, standardization is needed to define the interface between the RU and AAS. There are two types of interface. One is the control, user and synchronization plane (C/U/S). It operates on per transmission time interval (TTI) basis and supports normal traffic. The other one is the management plane, which operates on a slower basis to support carrier setup, configuration, and exchange parameters between O-DU and O-RU, etc. See FIG. 3, which shows an example of ORAN functional split in a NR O-RAN network node, e.g., base station.

The O-DU could be a traditional DU based on dedicated hardware (HW) and software (SW). The O-DU could also be a cloud based solution using general HW with RAN SW. A traditional DU may have a proprietary interface with an O-RU if both come from same vendor.

The connection between DU or vDU and AAS uses a packet based radio interconnect, evolved common public radio interface (eCPRI). If DU or vDU and AAS come from the same vendor, a proprietary interface based on eCPRI could be used. One example is the C2 interface used in some product of the present assignee. If they come from different vendors, the ORAN based interface based on eCPRI may be used.

For both C2 and ORAN based interface, there will user plane and management plane. User plane carries the user data and corresponding control information. It operates on a slot basis. Management plane is to set up and control a carrier and receive updates on the state of the carrier.

The example diagram of FIG. 4 shows that multiple carriers could be overlapping and provide overlapping coverage. This may provide enough capacity for a dense population area such as a train station. In this case, EMF back-off per carrier on each scheduler should be coordinated to ensure that the total EMF level is below a pre-determined threshold. This is desired for RAN features such as Carrier Aggregation (CA), dynamic spectrum sharing (DSS), etc.

In an active network, traffic may vary over time. Therefore, the time-averaged power resulting from traffic may also vary over time, and may be much lower than peak power. So, the safety distance of the AAS should be dependent on time-averaged power instead of peak power.

As shown in FIG. 5, which is a block diagram of an example of cell wide EMF power back off control, the time-averaged power is estimated at the DU or vDU. A proportional integral derivative (PID) controller is employed to limit the physical resource block (PRB) resources at the scheduler so that the time averaged power is limited to a pre-defined value. This will then increase the safety distance shown in FIG. 2.

Note that the PRB resource limitation is only applied on traffic channels, such as the physical downlink shared channel (PDSCH). It will not be applied to control channels, such as the physical downlink control channel (PDCCH). This will avoid the impact on coverage.

FIG. 6 is an example of the implementation of such a scheme inside a DU or vDU. The scheduler provides the scheduling details, such as an amount of radio resources that are allocated to a user. EMF back-off control may need to be perform on a per TTI (slot) basis.

The EMF back-off controller will then estimate the total power within a control step (for example, 0.6 second) by considering all the radio resources being scheduled, as seen in the example of FIG. 7. The total power will also be averaged with the past samples to get a time-averaged value. At each control step, the EMF back-off controller will run a PID controller to estimate the required actuator value, such as PRB limitation required at the scheduler, so that the time-averaged EMF power can be maintained. In this solution, beamforming gain is assumed to be equal in all directions within the cell. This is referred to herein as a cell wide EMF power back-off solution.

In the cell wide solution, the power restriction is applied to all directions. In actual deployment, user distribution will not be even. Some directions will have more users, some will have less. Applying PRB reduction in directions with less traffic will result in unnecessary capacity loss. This solution uses same power restriction threshold in all directions. As shown in the example of FIG. 8, in a live or active network, if a direction where a grade school, e.g., kindergarten, needs greater EMF power back off, a lower threshold will be needed to accommodate this direction. This will then introduce unnecessary capacity loss in other directions with higher threshold. Therefore, a directional EMF power back-off solution will provide significant capacity improvement over cell wide solution.

As shown in the example of FIG. 9, in directional EMF solution, a cell is divided into multiple directions. A user transmission will be mapped to one or more directions. Time averaged power per direction is estimated in the same way as the cell wide solution. Power reduction is only applied to the directions in need.

For time averaged power estimation, the transmission direction estimation for reciprocity based single user (SU) or multi-user (MU) MIMO will result in a large number of calculations needed to precisely estimate the radiation pattern. This is even more complicated given many different radio types and cell shapes.

As shown in the example of FIG. 10, at a network node transmitter, a two-dimensional radiation pattern is formed in both azimuth and elevation directions. A prediction of this pattern is used to estimate the time-averaged transmission power per direction.

In order to estimate the radiation pattern of the transmission, the beamforming gain, $G_{i,j}(q)$, for allocation to user q utilizing the precoding matrices {W(q)} is calculated using the following formula:

$$G_{i,j}(q) = \sum_{k=1}^{N_L(q)} \sum_{p=0}^{1} \left| w_k^{(p)}(q)^T b(i, j) \right|^2$$

where b(i,j) is a base beam vector, also called a steering vector, for direction (i,j). $N_L(q)$ is the number of spatial layers of user q, and p is the index of the two antenna polarizations.

As shown in the example of FIG. 11, a port to antenna (P2A) mapping includes mapping a logical antenna port to a set of physical antenna ports. The solution of this problem impacts final radiation pattern.

Calculation of both beamforming gain and P2A mapping requires a significant amount of information such as AAS antenna array geometry, sector carrier knowledge, etc. This information is available inside the AAS and not in the DU or vDU.

In addition, the scheduler inside the DU or vDU is optimized to operate radio resource management (RRM) types of algorithms. It is not suitable to run radiation pattern estimation, which is a physical layer algorithm.

SUMMARY

Some embodiments advantageously provide a method and system for distributed directional electromagnetic field (EMF) power back off framework with open radio access network (ORAN).

In some embodiments a directional EMF power back-off framework is provided to distribute the directional EMF power-back off feature into both the DU/vDU and the radio (AAS). The proposed solution will support O-RAN in the future.

In the new framework, directional power per control step is estimated at radio (AAS) side. Multiple directional EMF power back-off controller will be implemented in the DU or vDU side. Necessary signaling will be needed between DU/vDU and radio.

In some embodiments, one or more of the following steps are performed:

Step 1. At an initialization stage, the DU/vDU and the radio may perform configurations through control plane signaling, or ORAN management plane signaling.

Step 2. At each TTI or slot, a directional EIRP may be estimated in the RU/O-RU based on all the information needed for normal traffic operation. For example, beam weights will be sent from the DU/vDU to the RU/O-RU via user plane signaling, or via the ORAN-CUS plane.

Step 3. The per-TTI directional EIRP may be accumulated to get per control step directional EIRP, which is then sent from the RU to the DU/vDU via control plane signaling, or by ORAN management plane signaling.

Step 4. At each control step, a directional EMF power back-off controller may run in the DU/vDU. The actuator value that is output by the directional EMF power back-off controller will be sent to the scheduler to enable time-average power back-off via power scaling or PRB reduction.

Step 5. At each control step, the directional EMF power back-off controller on the DU/vDU may coordinate with other carriers or radio access technologies (RAT), such as LTE, on the same DU/vDU serving the same geographical area.

Step 6. At each control step, the user plane control (UPC) on the DU/vDU may coordinate with other carriers on other DU/vDUs serving the same geographical area.

Some embodiments provide a distributed framework allowing the directional EMF power back-off solution to be implemented in different hardware. This framework offloads the scheduler operation on the DU and vDU by moving directional power estimation to the radio, where the information about the antenna, carrier and radio is available to do directional estimation. This allows an optimal implementation of directional power estimation. This framework will also work on vDU based ORAN.

This framework also supports multi-carrier EIRP coordination on the same DU/vDU and other DU/vDU.

According to one aspect, a digital unit configured to interoperate with a radio unit in a network node and to communicate with a plurality of wireless devices (WDs) is provided. The digital unit includes processing circuitry configured to: for each of a plurality of transmission time intervals, TTIs, and for each WD of the plurality of WDs, map a transmission intended for the WD to a direction of a sector encompassing the WD. The processing circuitry is further configured to, for each of a plurality of control step intervals and for each of a plurality of directions: receive an estimated time-average power from the radio unit; and compare the received estimated time-average power to a threshold corresponding to the direction. The processing circuitry is further configured to apply power scaling during a control step interval, the power scaling being applied to scale a power of transmission in each direction for which the received estimated time-average power exceeds the threshold corresponding to the direction.

According to this aspect, in some embodiments, the power scaling includes reducing the power scale of a number of physical resource blocks, PRBs, allocated to transmissions in a direction for which the estimated time-average power exceeds the threshold corresponding to the direction. In some embodiments, a control step interval of the plurality of control step intervals exceeds a TTI by a factor of greater than 1000. In some embodiments, each threshold corresponding to a direction is based at least in part on a predefined constraint on a maximum time-average power of transmissions in the direction. In some embodiments, the constraint is a constraint on a maximum equivalent isotropic radiated power, EIRP, for that particular direction.

According to another aspect, a method in a digital unit configured to interoperate with a radio unit in a network node is provided, where the network node is configured to communicate with a plurality of wireless devices (WDs). The method includes for each of a plurality of transmission time intervals, TTIs, and for each WD of the plurality of WDs, mapping a transmission intended for the WD to a direction of a sector encompassing the WD. The method also includes for each of a plurality of control step intervals and for each of a plurality of directions: receiving an estimated time-average power from the radio unit; and comparing the received estimated time-average power to a threshold corresponding to the direction. The method also includes applying power scaling during a control step interval, the power scaling being applied to scale a power of transmission in each direction for which the received estimated time-average power exceeds the threshold corresponding to the direction.

According to this aspect, in some embodiments, the power scaling includes reducing the power scale of a number of physical resource blocks, PRBs, allocated to transmissions in the direction for which the estimated time-average power exceeds the threshold corresponding to the direction. In some embodiments, a control step interval of the plurality of control step intervals exceeds a TTI by a factor of greater than 1000. In some embodiments, each threshold corresponding to a direction is based at least in part on a predefined constraint on a maximum time-averaged power of transmissions in the direction. In some embodiments, the constraint is a constraint on a maximum equivalent isotropic radiated power, EIRP of that direction.

According to yet another aspect, a radio unit configured to interoperate with a digital unit in a network node, the network node configured to communicate with a plurality of wireless devices, WDs is provided. The radio unit includes processing circuitry configured to: receive from the digital unit a plurality of directions and at least one power scaling factor, each power scaling factor corresponding to a direction determined by the digital unit to be a direction in which power is to be scaled. For each of a plurality of transmission time intervals, TTIs, and for each of a plurality of directions, the processing circuitry is further configured to estimate a transmission power for the direction; and for each of a plurality of control step intervals and for each of the plurality of directions: estimate a time-average power for the direction based on an average of a set of estimated transmission power values for the direction during a control step interval; and transmit the time-average power for each direction to the digital unit.

According to this aspect, in some embodiments, the processing circuitry is further configured to: receive an allocation of scheduled resources for each direction of the plurality of directions; and transmit power in each direction of the plurality of directions based on the allocation of scheduled resources for each direction. In some embodiments, the processing circuitry is further configured to apply one of the at least one power scaling factor to a transmission power in a direction corresponding to the one of the at least one power scaling factor. In some embodiments, the estimation of time average power for a direction is based at least in part on a number of physical resource blocks times a power scaling factor of the at least one power scaling factor. In some embodiments, a control step interval of the plurality of control step intervals exceeds a TTI by a factor of greater than 1000.

According to another aspect, a method in a radio unit configured to interoperate with a digital unit in a network node, the network node configured to communicate with a plurality of wireless devices, WDs, is provided. The method includes receiving from the digital unit a plurality of directions and at least one power scaling factor, each power scaling factor corresponding to a direction determined by the digital unit to be a direction in which power is to be scaled. For each of a plurality of transmission time intervals, TTIs, and for each of a plurality of directions, the method includes estimating a transmission power for the direction. For each of a plurality of control step intervals and for each of the plurality of directions, the method includes estimating a time-average power for the direction based on an average of a set of estimated transmission power values for the direction during a control step interval. The method also includes transmitting the time-average power for each direction to the digital unit.

According to this aspect, in some embodiments, the method further includes receiving an allocation of scheduled resources for each direction of the plurality of directions and transmitting power in each direction of the plurality of directions based on the allocation of scheduled resources for each direction. In some embodiments, the method further includes applying one of the at least one power scaling factor to a transmission power in a direction corresponding to the one of the at least one power scaling factor. In some embodiments, the estimation of time average power for a direction is based at least in part on a number of physical resource blocks times a power scaling factor of the at least one power scaling factor. In some embodiments, a control step interval of the plurality of control step intervals exceeds a TTI by a factor of greater than 1000.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
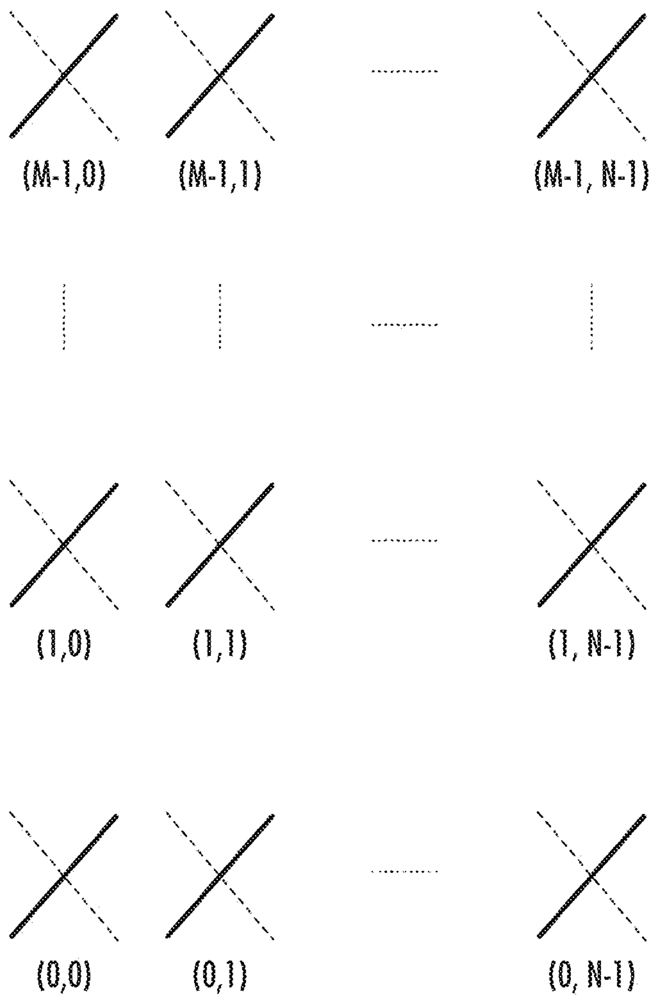
FIG. 1 is an illustration of an array of cross-polarized antennas.
Figure 2:
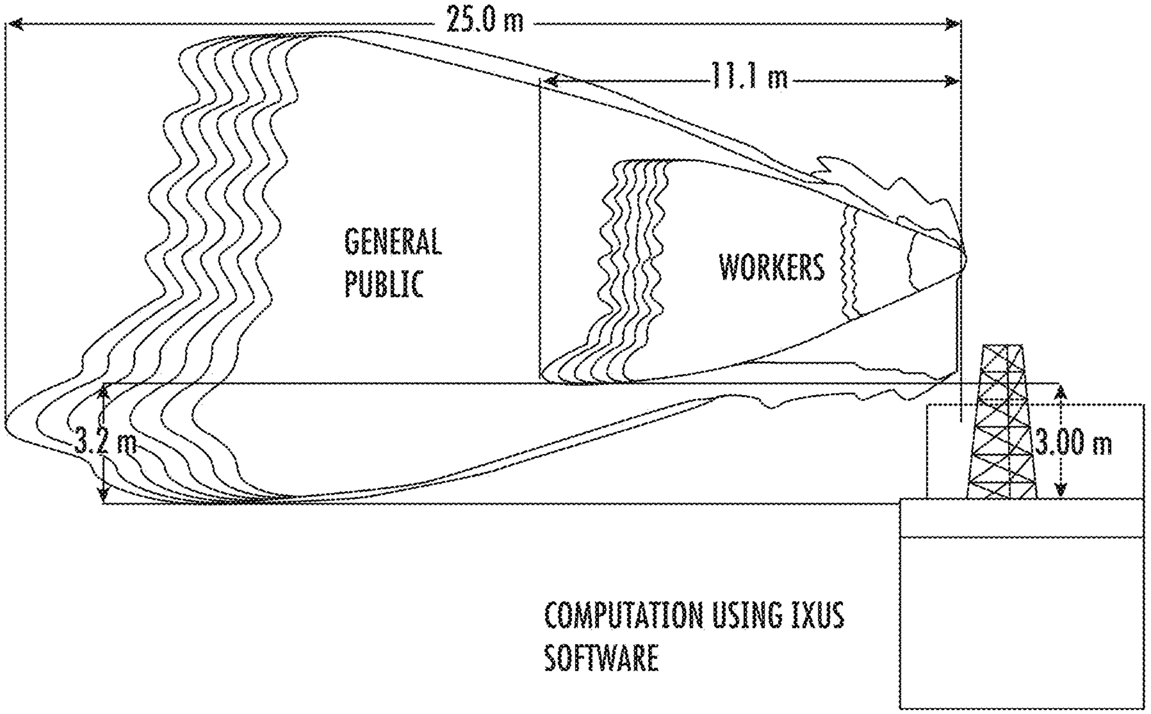
FIG. 2 is an illustration of example EMF power restrictions for the general public and workers.
Figure 3:
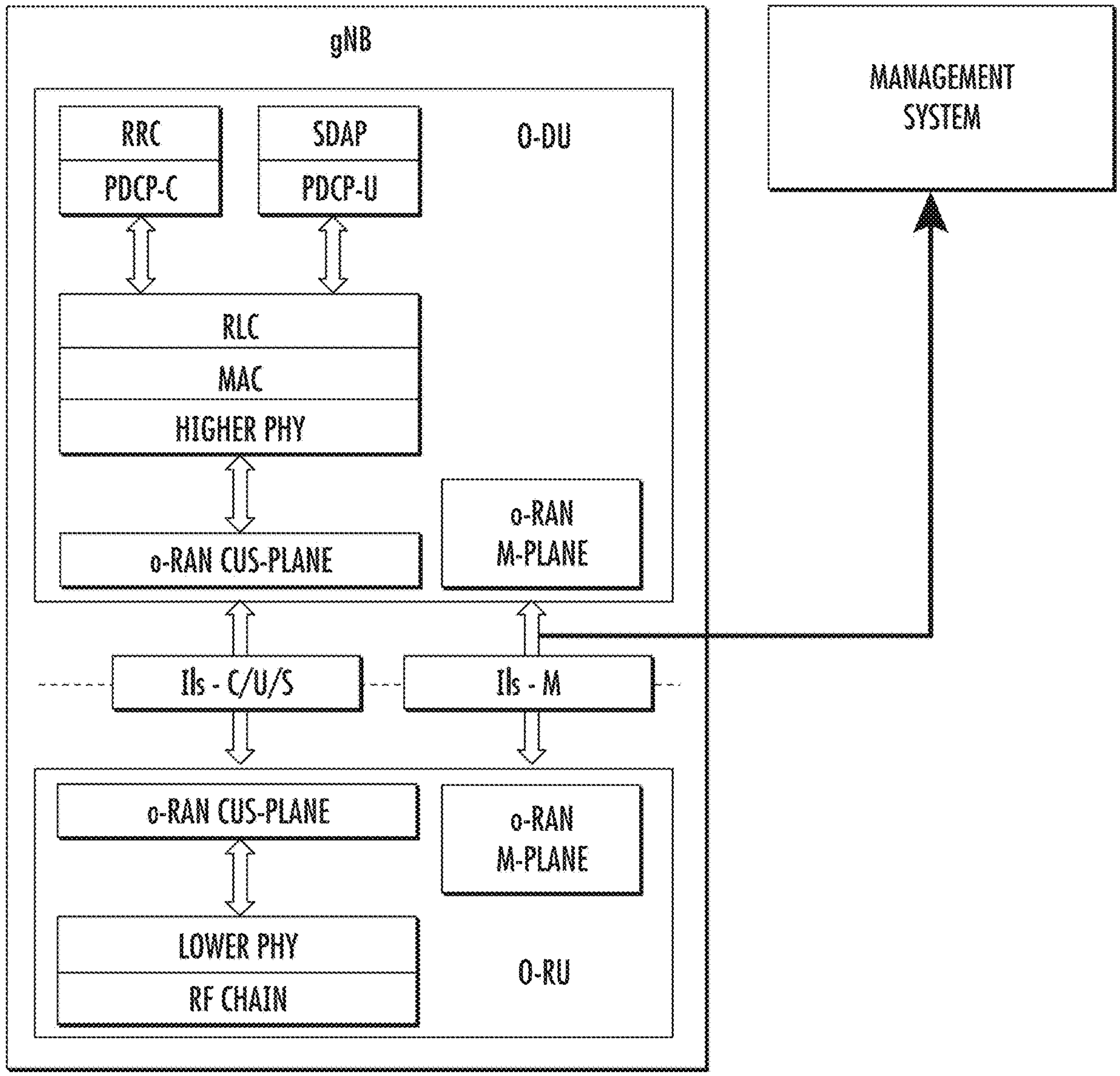
FIG. 3 is a block diagram of an NR O-RAN network node.
Figure 4:
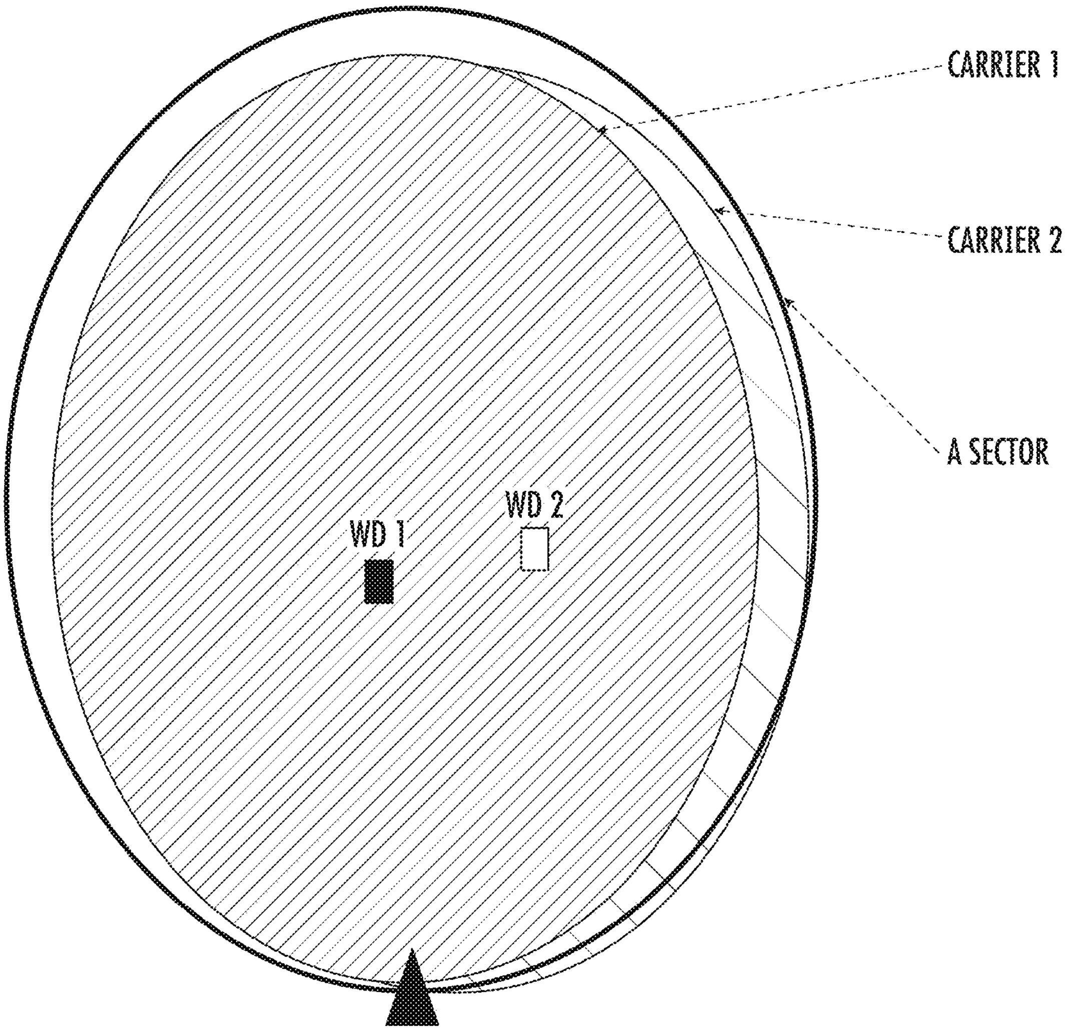
FIG. 4 is an illustration of coverage zones for two carriers.
Figure 5:
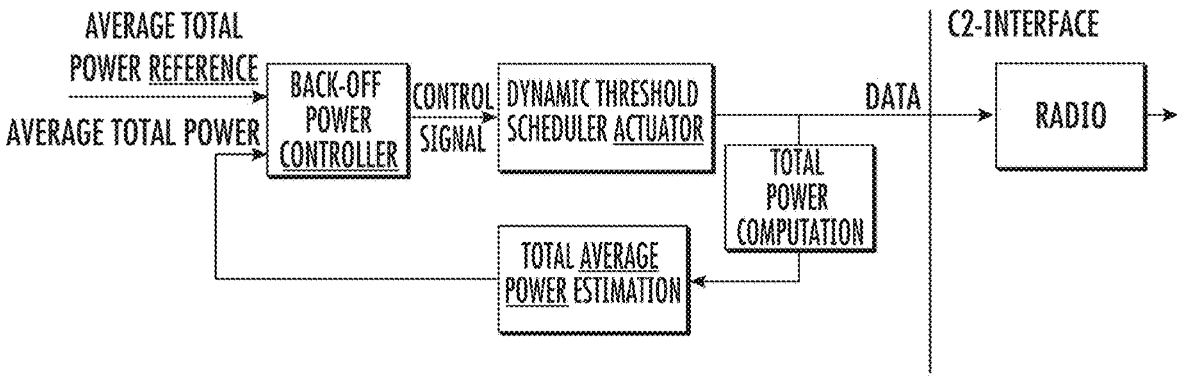
FIG. 5 is a block diagram of cell wide EMF power back off control.
Figure 6:
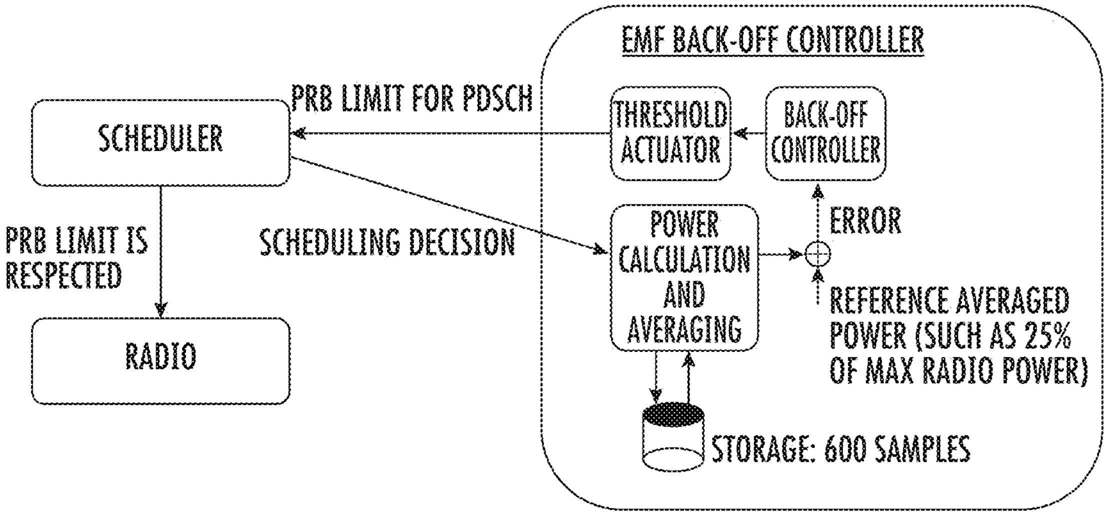
FIG. 6 is a block diagram of a scheduler interacting with an EMF back off controller.
Figure 7:
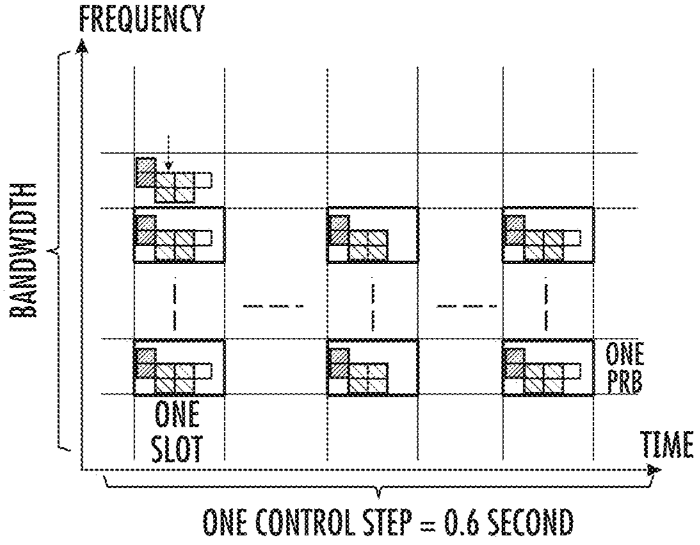
FIG. 7 is an illustration of radio resources over which power is estimated.
Figure 8:
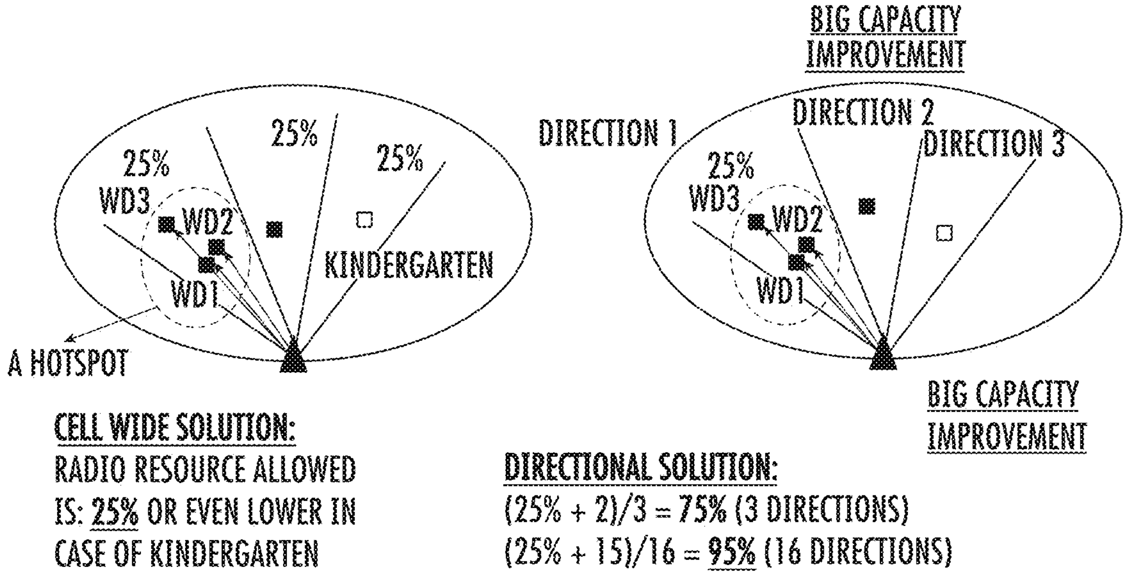
FIG. 8 is a comparison between a cell wide power back off solution and a directional power back off solution.
Figure 9:
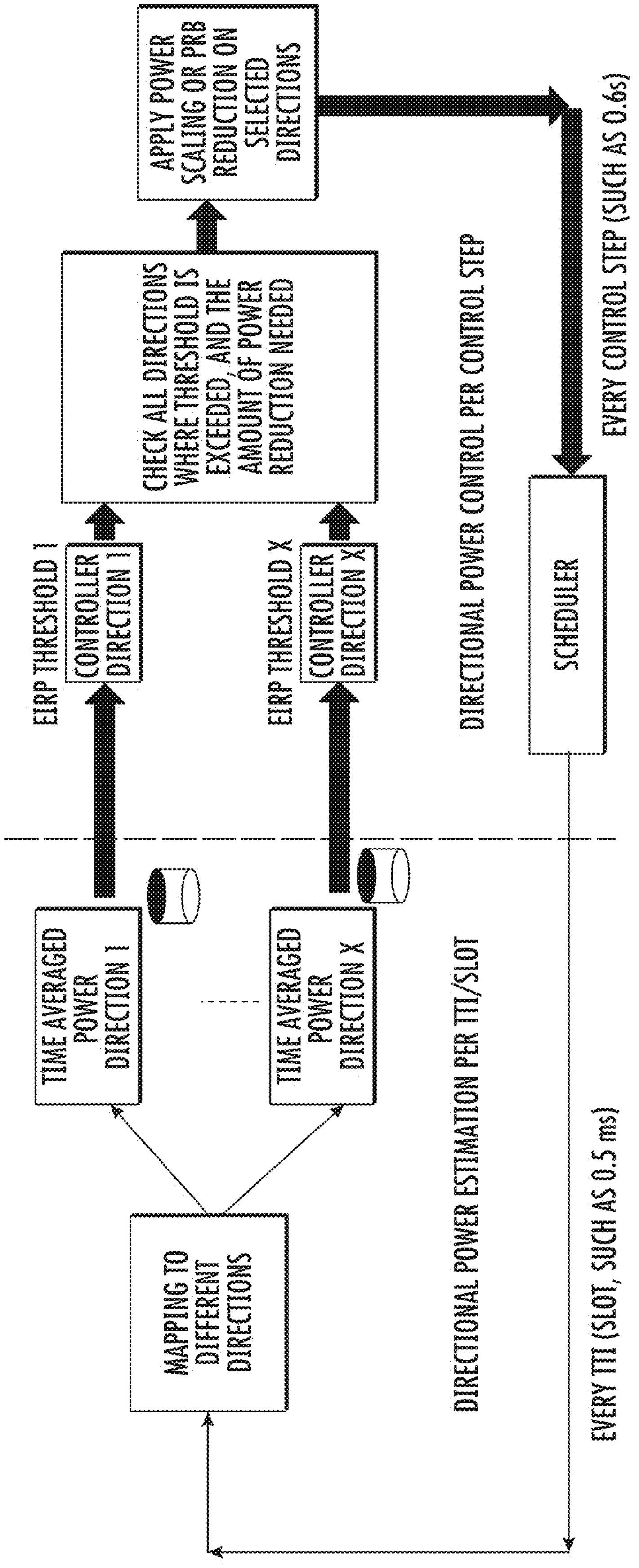
FIG. 9 is an illustration of example directional power estimation and control solution.
Figure 10:
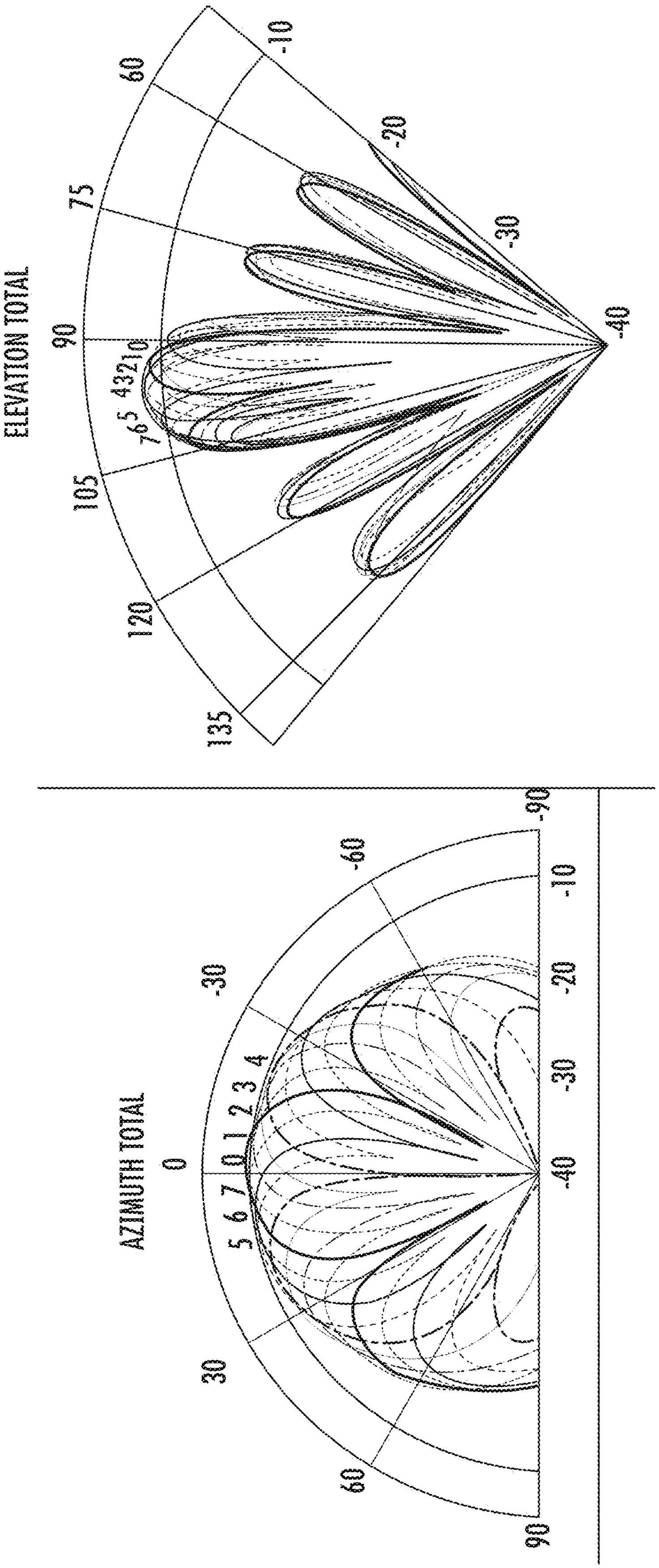
FIG. 10 is an illustration of example radiation patterns in azimuth and elevation directions.
Figure 11:
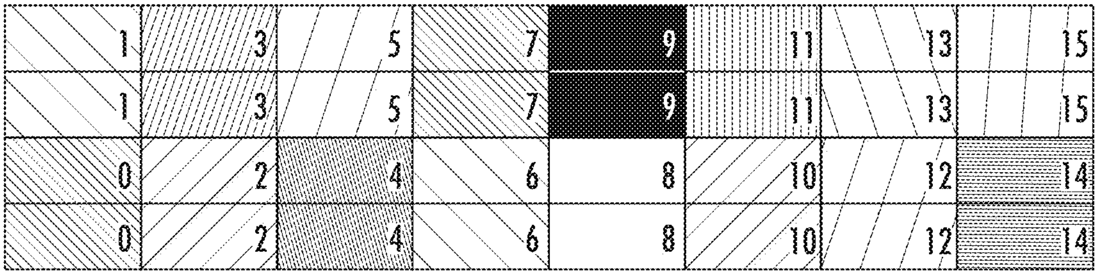
FIG. 11 is an illustration of example port to antenna mapping.

Before describing in detail example embodiments, it is noted that the embodiments reside primarily in combinations of apparatus components and processing steps related to distributed directional electromagnetic field (EMF) power back off framework with open radio access network (ORAN). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD. Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 12:
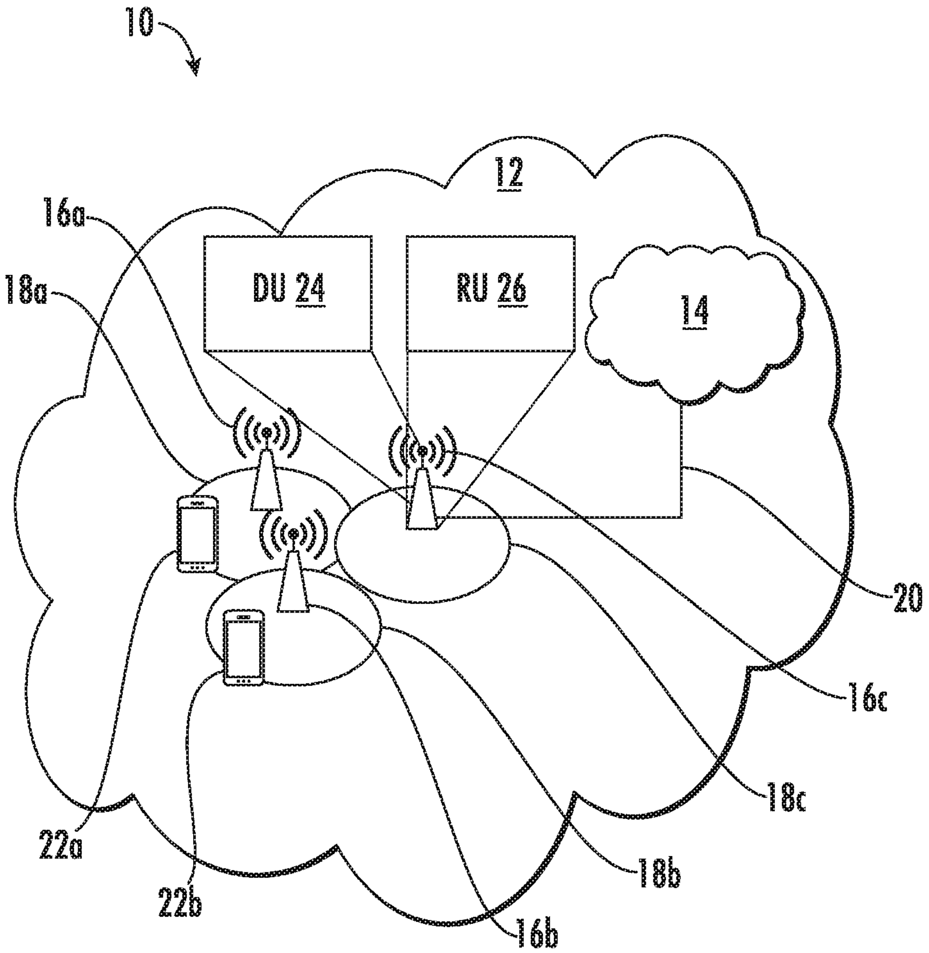
FIG. 12 is a schematic diagram of an example network architecture illustrating a communication system according to principles disclosed herein.

Referring again to the drawing figures, in which like elements are referred to by like reference numerals, there is shown in FIG. 12 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured with a digital unit (DU) 24 and a radio unit (RU) 26. The DU 24 may be an O-DU 24. The RU 26 may be an O-RU 26 or AAS 26. The digital unit 24 provides baseband processing to perform at least applying power scaling during a control step interval, the power scaling being applied to scale a power of transmission in each direction for which the received estimated time-average power exceeds the threshold corresponding to the direction. The radio unit 26 provides processing to perform at least estimating a time-average power for the direction based on an average of a set of estimated transmission power values for the direction during a control step interval.

Example implementations, in accordance with an embodiment, of the WD 22 and network node 16 discussed in the preceding paragraphs will now be described with reference to FIG. 13.

The communication system 10 includes a network node 16 provided in a communication system 10 and including hardware 28 enabling it to communicate with the WD 22. The hardware 28 may include a radio unit 26 for setting up and maintaining at least a wireless connection 32 with a WD 22 located in a coverage area 18 served by the network node 16. The radio unit 26 may be formed as or may include, for example, one or more RF transmitters, one or more RF receivers, and/or one or more RF transceivers. The radio unit 26 includes an array of antennas 34 to radiate and receive signal(s) carrying electromagnetic waves. The radio unit 26 is also further configured to at least estimate a time-average power for the direction based on an average of a set of estimated transmission power values for the direction during a control step interval. The radio unit 26 may sometimes be referred to herein as AAS 26. The radio unit 26 may further comprise processing circuitry 35 configured to perform functions of the radio unit 26 as disclosed herein.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from)

the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include the digital unit 24 which is configured to at least apply power scaling during a control step interval, the power scaling being applied to scale a power of transmission in each direction for which the received estimated time-average power exceeds the threshold corresponding to the direction.

The communication system 10 further includes the WD 22 already referred to. The WD 22 may have hardware 44 that may include a radio unit 46 configured to set up and maintain a wireless connection 32 with a network node 16 serving a coverage area 18 in which the WD 22 is currently located. The radio unit 46 may be formed as or may include, for example, one or more RF transmitters, one or more RF receivers, and/or one or more RF transceivers. The radio unit 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 13:
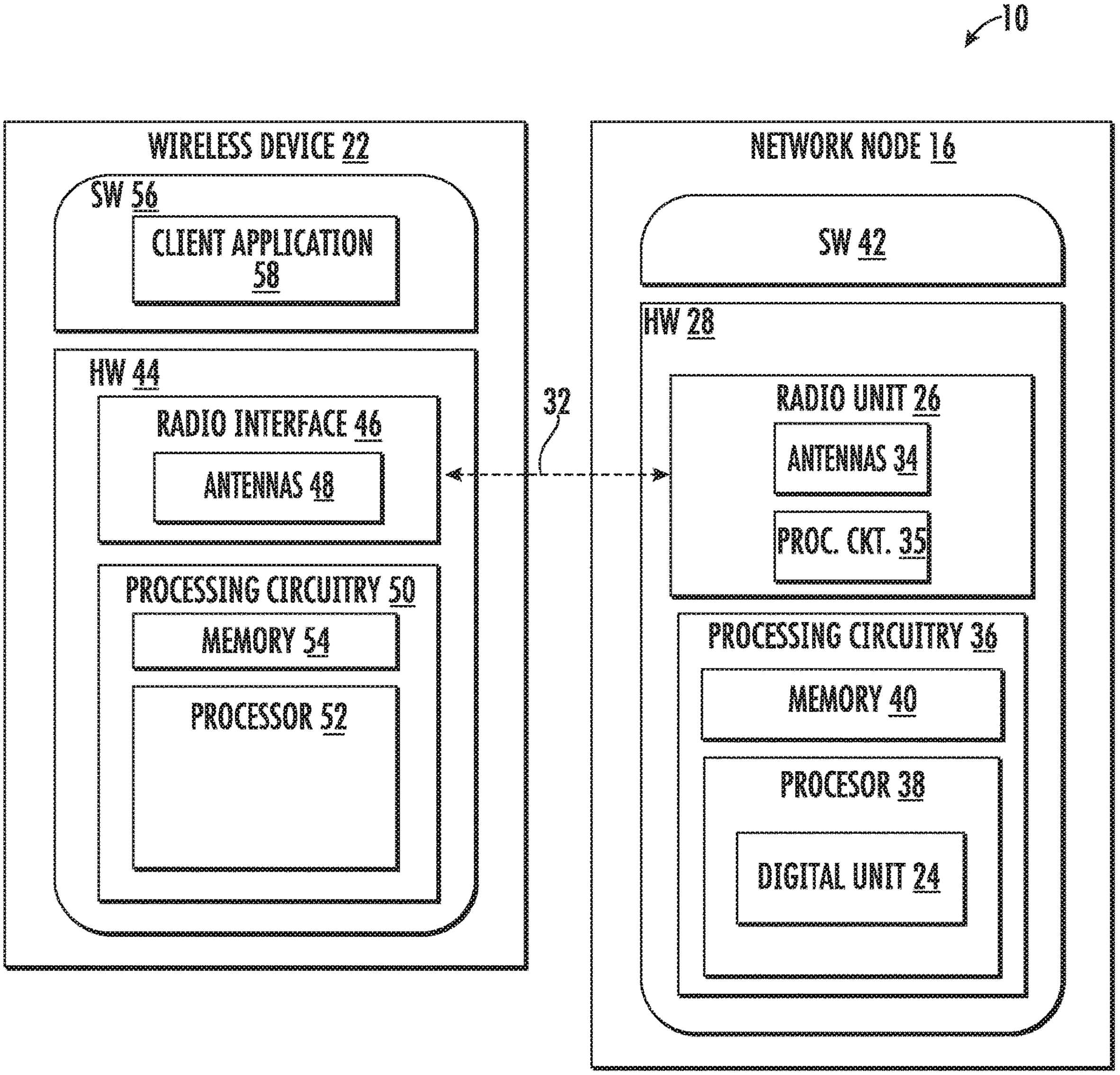
FIG. 13 is a block diagram of a network node in communication with a wireless device over a wireless connection according to some embodiments of the present disclosure.

In some embodiments, the inner workings of the network node 16 and WD 22 may be as shown in FIG. 13 and independently, the surrounding network topology may be that of FIG. 12.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 12 and 13 show various "units" such as DU 24 and RU 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 14:
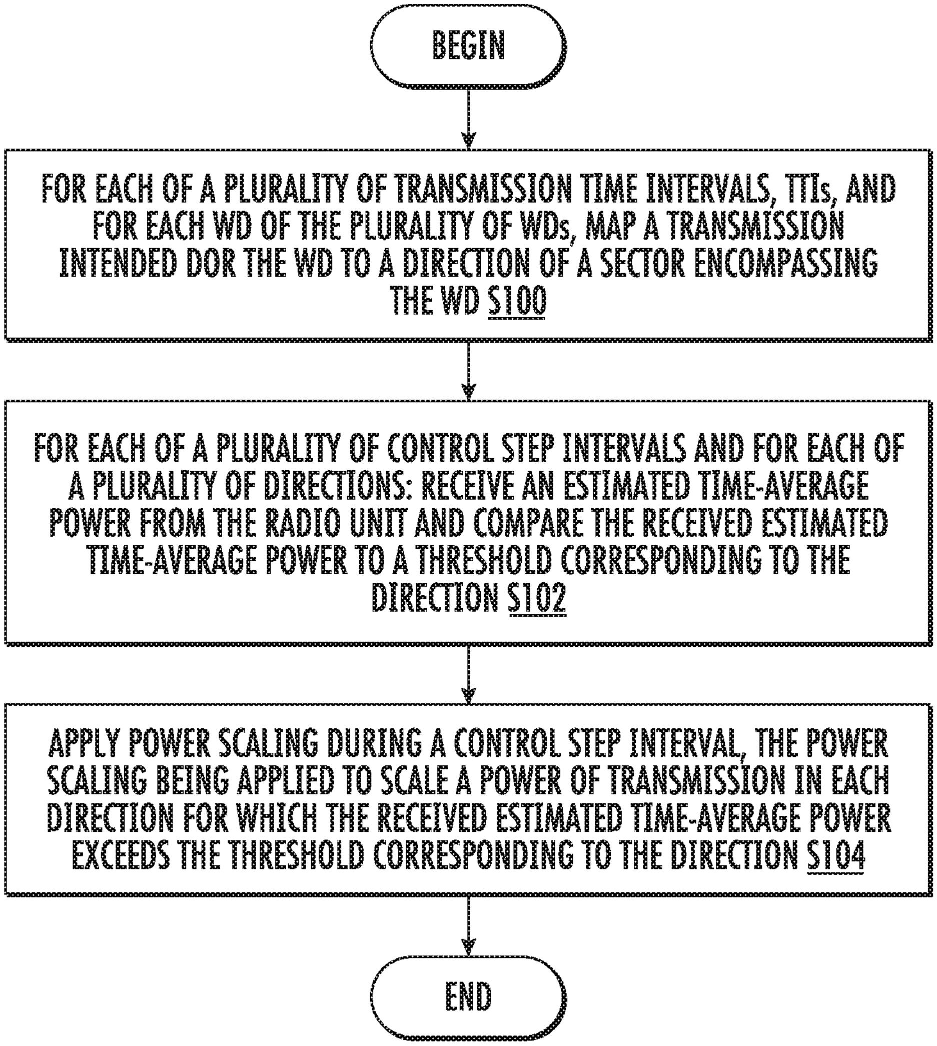
FIG. 14 is a flowchart of an example process in a digital unit (DU) for distributed directional electromagnetic field (EMF) power back off framework with open radio access network (ORAN) according to some embodiments of the present disclosure.

FIG. 14 is a flowchart of an example process in a network node 16 according to principles disclosed herein. One or more blocks described herein may be performed by one or more elements of network node 16 such as by one or more of processing circuitry 36 (including the digital unit 24), processor 38, and/or radio unit 26. Network node 16 such as via processing circuitry 36 and/or processor 38 and/or radio unit 26 is configured to, for each of a plurality of transmission time intervals, TTIs, and for each WD of the plurality of WDs, map a transmission intended for the WD to a direction of a sector encompassing the WD (Block S100). The process also includes, for each of a plurality of control step intervals and for each of a plurality of directions: receiving an estimated time-average power from the radio unit; and comparing the received estimated time-average power to a threshold corresponding to the direction (Block S102). The process also includes applying power scaling during a control step interval, the power scaling being applied to scale a power of transmission in each direction for which the received estimated time-average power exceeds the threshold corresponding to the direction (Block S104).

Figure 15:
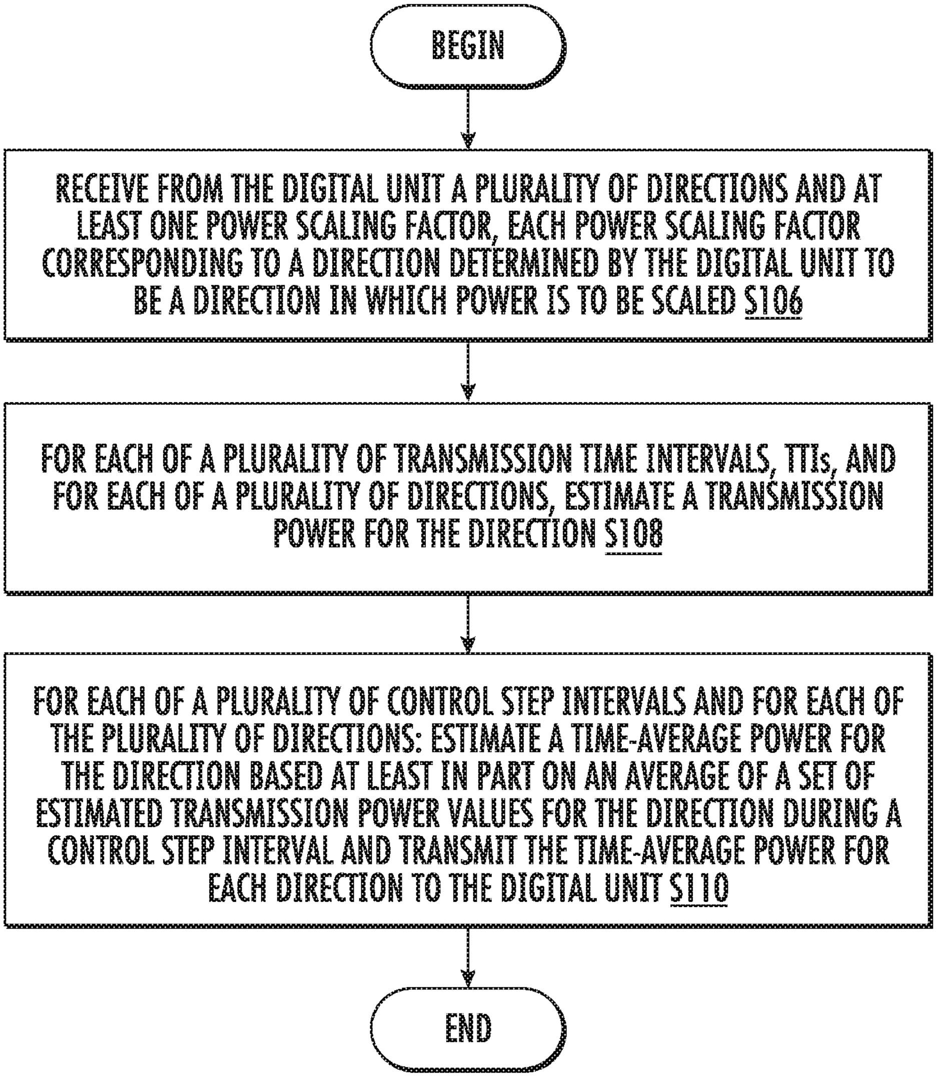
FIG. 15 is a flowchart of an example process in a radio unit (RU) for distributed directional electromagnetic field (EMF) power back off framework with open radio access network (ORAN) according to some embodiments of the present disclosure.

FIG. 15 is a flowchart of an example process in a wireless device 22 according to some embodiments of the present disclosure. One or more blocks described herein may be performed by one or more elements of wireless device 22 such as by one or more of processing circuitry 50, processor 52, and/or radio unit 46. Wireless device 22 such as via processing circuitry 50 and/or processor 52 and/or radio unit 46 is configured to receive from the digital unit a plurality of directions and at least one power scaling factor, each power scaling factor corresponding to a direction determined by the digital unit to be a direction in which power is to be scaled (Block S106). The process also includes, for each of a plurality of transmission time intervals, TTIs, and for each of a plurality of directions, estimate a transmission power for the direction (Block S108). The process also includes, for each of a plurality of control step intervals and for each of the plurality of directions: estimate a time-average power for the direction based at least in part on an average of a set of estimated transmission power values for the direction during a control step interval; and transmit the time-average power for each direction to the digital unit (Block S110).

Having described the general process flow of arrangements of the disclosure and having provided examples of hardware and software arrangements for implementing the processes and functions of the disclosure, the sections below provide details and examples of arrangements for distributed directional electromagnetic field (EMF) power back off framework with open radio access network (ORAN)

Figure 16:
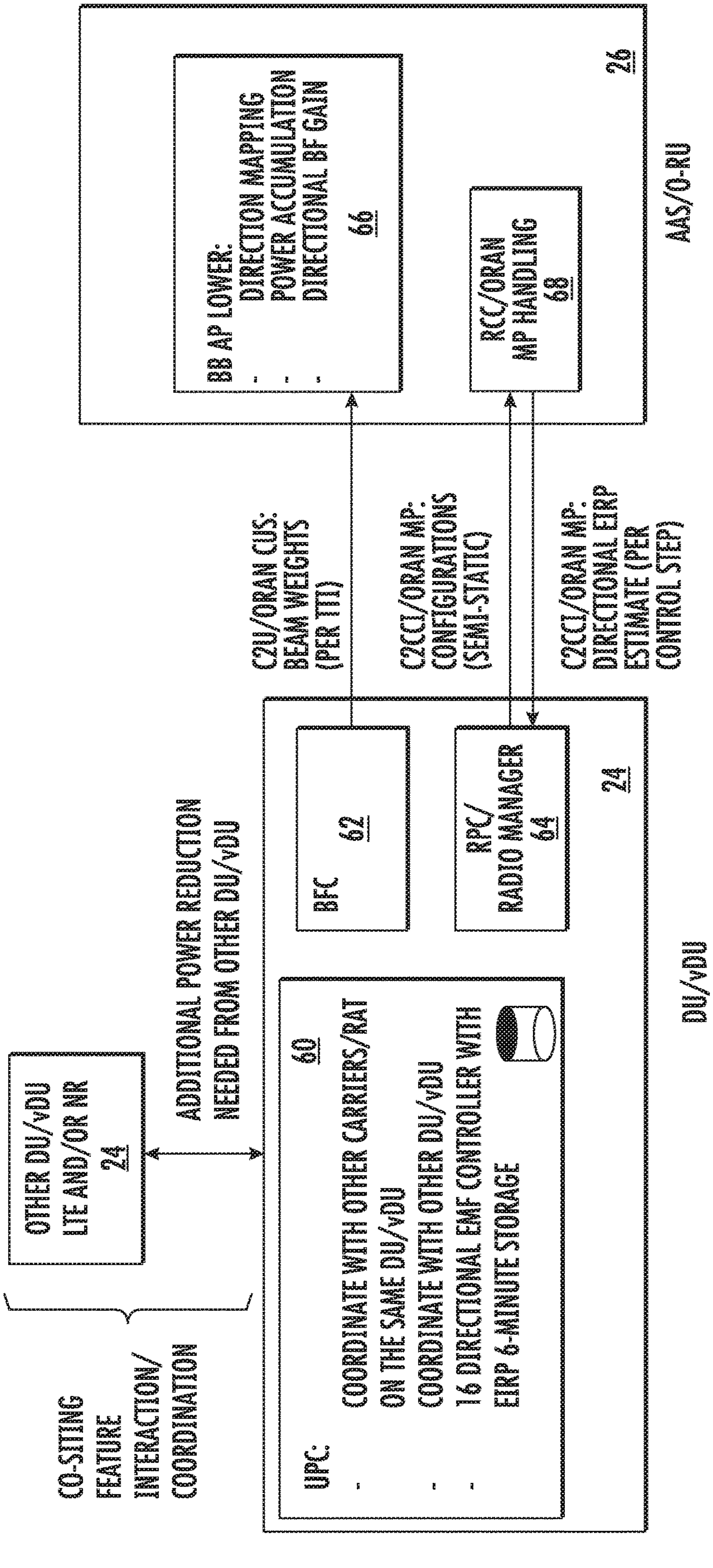
FIG. 16 is an illustration of example baseband application lower layer time averaged EMF power estimation.

As shown in FIG. 16, at the AAS 26 or O-RU 26, a baseband application lower layer performs time-averaged EMF power estimation for each direction. It will take scheduling and beamforming information from the DU 24 or vDU 24 per TTI to perform the time-averaged EMF power estimation for each direction. At each control step, the AAS 26 will report the time-averaged EMF power to the DU 24 or vDU 24.

At the DU 24 or vDU 24, directional EMF power back-off will be performed at user plane control (UPC). In addition, the EMF controller will coordinate the EMF power back off of other carriers on the same or other DU 24 or vDU 24.

Signaling Framework Between DU 24 or vDU 24 and AAS 26 or O-RU 26

Additional messages may be defined between the DU 24 or vDU 24 and the AAS 26 or O-RU 26 to support the directional EMF power back-off.

Figure 17:
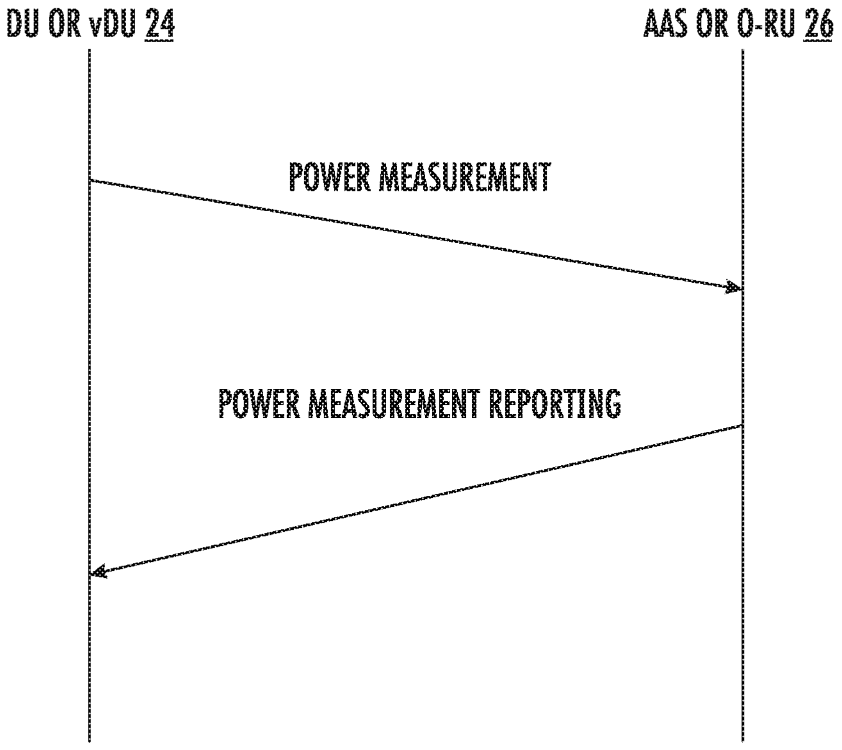
FIG. 17 is an illustration of example power measurement communications between a DU and an RU.

As shown in FIG. 17, DU 24 or vDU 24 will ask the AAS 26 or the O-RU 26 if the time-averaged directional EMF power measurement is supported in the message "powerMeasurement", where direction details, such as how many directions in the horizontal or vertical direction are included, are provided. The AAS 26 or the O-RU 26 sends a confirmation in the message "powerMeasurementCapable". Other parameters related to EMF power back-off may also be exchanged using these two messages. This includes control step size, such as 0.6 second.

Figure 18:
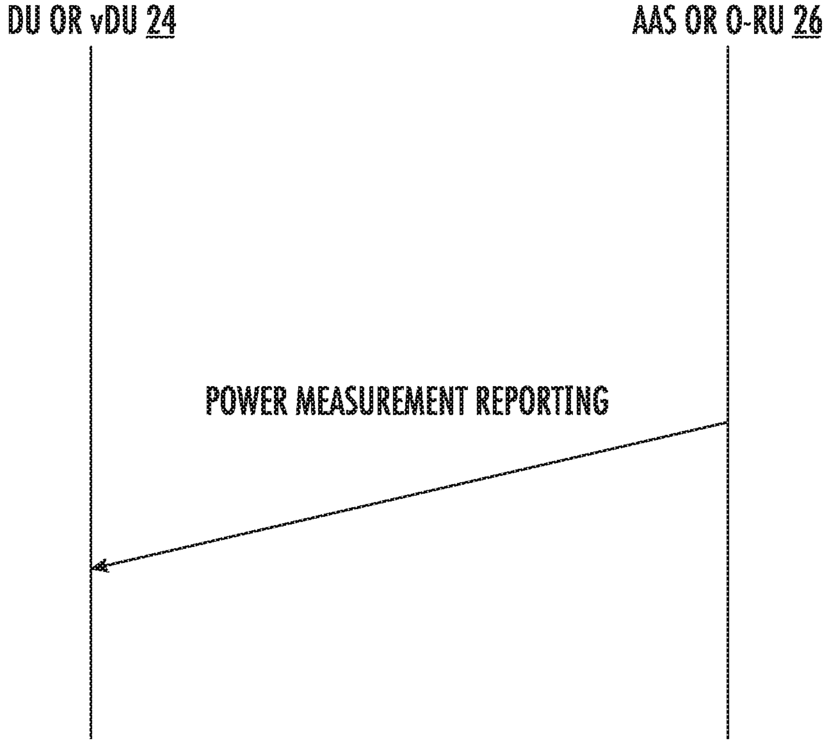
FIG. 18 is an illustration of example power measurement reporting from an RU to a DU.

As shown in FIG. 18, time-averaged power for all directions are reported from the AAS 26 or O-RU 26 to the DU 24 or vDU 24 using message "powerMeasurementReporting".

Initialization

At carrier setup, directional EMF is configured between the DU 24 or vDU 24 and the AAS 26 or O-RU 26 using the messages defined above. After initialization, time-averaged EMF powers for all directions will be reported every control step.

During initialization, a direction table is created in both the DU 24 or vDU 24 and the AAS 26 or O-RU 26. A sector is defined as a geographical area a carrier provides. For example, it could cover spatial direction from −x degrees to +x degrees horizontally and from −y to +y degrees vertically. To perform directional EMF power control, the sector can be divided into a fixed number of angular directions.

The fixed number of angular directions should cover all the angles within the sector in both horizontal and elevation directions. The number should be even so that can be up to two elevation angles in some embodiments. In this example, 16 directions are used. An EMF direction is defined as a direction in which the average power is restricted. It could be another size depending on baseband resource limitation. Direction 1 to 8 cover 8 different horizontal directions for one elevation angle and direction 9 to 16 cover the other 8 horizontal directions for the other elevation angle.

Time-Averaged EMF Estimation in AAS 26

Direction Mapping

The scheduling information is sent from the DU 24 or vDU 24 to the AAS 26 or O-RU 26 per TTI. The following information is expected to be available for all the channels (such as PDSCH, PDCCH, etc.) and all the WDs 22:

- Cell shape;
- CSI-RS settings;
- Codebook Config;
- PMI (GOB WD);
- Weight for RAT (RAT WD);
- Power scaling factors;
- Resource allocation details (PRB and symbol locations); and/or
- SU or MU.

Each transmission per channel per user may be mapped to a specific EMF direction. An example of direction mapping for a GOB user using PMI is given below.

Figure 19:
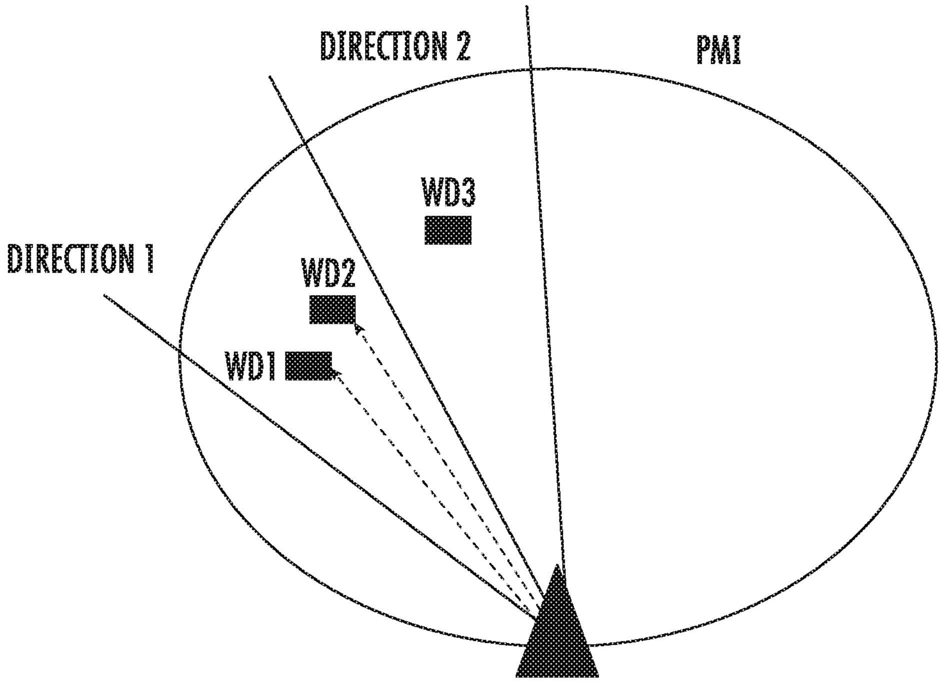
FIG. 19 is an illustration of an example PMI mapping to a direction

A PMI will be reported by one WD 22 to reflect the angular information of the WD 22. The PMI indicates the WD 22 direction. Depending on the actual array configuration and CSI-RS configuration, the PMI will be mapped to a particular direction. As shown in FIG. 19, the PMI of both WD1 and WD2 belong to direction 1. The two PMI could be the same or different. The PMI of WD3 belongs to direction 2. Different WDs 22 could have the same or different CSI-RS config.

Figure 20:
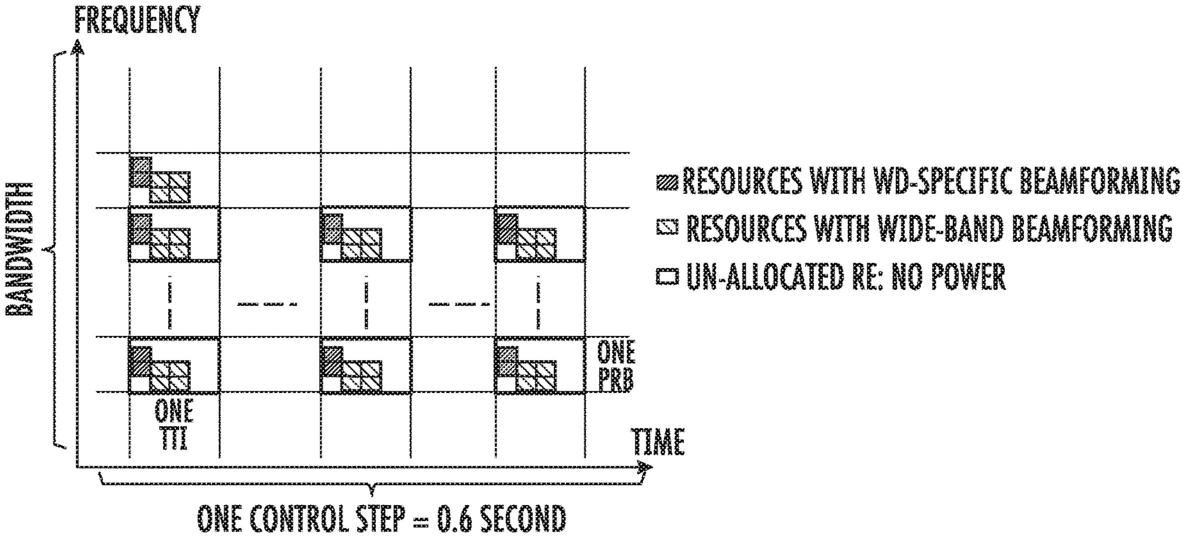
FIG. 20 is an illustration of example resource allocations for directional power estimation.

As seen in FIG. 20, momentary power for direction i per TTI can be estimated by nominal gain, power scaling and allocations for all channels:

$$\text{Power}(i, t) = \sum\nolimits_{n=1}^{N} (G(n, i, t) * S(n, t) * prb(n, t))$$

where, i is the direction index, t is TTI index with a control step, n is the allocation index assuming N number of allocations. An allocation could refer to either a WD 22 specific channel (such as PDSCH and or PDCCH) or a common channel (such as signal synchronization block (SSB), CSI-RS). G(n, i, t) is the beamforming gain of user n within direction I, prb(n,t) is the number of PRB of allocation n, S(n, t) is the power scaling factor of allocation n. The total power per control step is then calculated by summing powers from all TTI within the control step assuming total number of TTI is M:

$$\text{Power}(i) = \sum\nolimits_{t=1}^{M} \text{Power}(i, t)$$

At each control step, the estimated time-averaged power for all directions will be reported to the DU 24 or vDU 24 using messages defined above.

Directional EMF Power Back-Off Control in DU 24 or vDU 24

Multiple Directional EMF Controller

A cell wide EMF power controller as described above can be applied per direction. In some embodiments, there will be a 16 cell wide EMF controller, one per direction. Different EMF thresholds can be applied for different directions. The required power reduction is individually applied to each direction individually.

Power Scaling Calculation

For each direction, a control signal, gamma, is derived from the EMF controller. It compares the gamma with an allowed threshold. If the threshold is exceeded, power restrictions may be applied to all directions requiring power restrictions. The power restriction could be restrictions on power scaling or PRB resources or both.

Apply Power Scaling and Link Adaptation Adjustment

For all the WDs 22 with PMI needing a power restriction, corresponding power scaling or PRB reduction may be applied. Pre-compensation on link adaption may be applied to compensate for the effect of power scaling. For any WD 22 requiring power scaling, a delta value to reduce the SINR in link adaption due to power scaling may be employed:

$$SINR = \text{delta} + \text{SINR\_from\_CQI} + OLA$$

Coordination with Other Carriers and RAT on the Same DU 24 or vDU 24

At each control step, the directional EMF power back-off controller on the DU 24 or vDU 24 will coordinate with other carriers or RATs on the same DU 24/vDU 24 serving the same geographical area.

Coordination with Other DU 24 or vDU 24

At each control step, the UPC will coordinate with other carriers on other DU 24/vDU 24 serving the same geographical area.

According to one aspect, a digital unit 24 configured to interoperate with a radio unit 26 in a network node 16 and to communicate with a plurality of wireless devices (WDs) 22 is provided. The digital unit 24 includes processing circuitry 36 configured to: for each of a plurality of transmission time intervals, TTIs, and for each WD 22 of the plurality of WDs 22, map a transmission intended for the WD 22 to a direction of a sector encompassing the WD 22. The processing circuitry 36 is further configured to, for each of a plurality of control step intervals and for each of a plurality of directions: receive an estimated time-average power from the radio unit; and compare the received estimated time-average power to a threshold corresponding to the direction. The processing circuitry 36 is further configured to apply power scaling during a control step interval, the power scaling being applied to scale a power of transmission in each direction for which the received estimated time-average power exceeds the threshold corresponding to the direction.

According to this aspect, in some embodiments, the power scaling includes reducing the power scale of a number of physical resource blocks, PRBs, allocated to transmissions in a direction for which the estimated time-average power exceeds the threshold corresponding to the direction. In some embodiments, a control step interval of the plurality of control step intervals exceeds a TTI by a factor of greater than 1000. In some embodiments, each threshold corresponding to a direction is based at least in part on a predefined constraint on a maximum time-average power of transmissions in the direction. In some embodiments, the constraint is a constraint on a maximum equivalent isotropic radiated power, EIRP, for that particular direction.

According to another aspect, a method in a digital unit 24 configured to interoperate with a radio unit 26 in a network node 16 is provided, where the network node 16 is configured to communicate with a plurality of wireless devices (WDs) 22. The method includes for each of a plurality of transmission time intervals, TTIs, and for each WD 22 of the plurality of WDs 22, mapping a transmission intended for the WD 22 to a direction of a sector encompassing the WD 22. The method also includes for each of a plurality of control step intervals and for each of a plurality of directions: receiving an estimated time-average power from the radio unit; and comparing the received estimated time-average power to a threshold corresponding to the direction. The method also includes applying power scaling during a control step interval, the power scaling being applied to scale a power of transmission in each direction for which the received estimated time-average power exceeds the threshold corresponding to the direction.

According to this aspect, in some embodiments, the power scaling includes reducing the power scale of a number of physical resource blocks, PRBs, allocated to transmissions in the direction for which the estimated time-average power exceeds the threshold corresponding to the direction. In some embodiments, a control step interval of the plurality of control step intervals exceeds a TTI by a factor of greater than 1000. In some embodiments, each threshold corresponding to a direction is based at least in part on a predefined constraint on a maximum time-averaged power of transmissions in the direction. In some embodiments, the constraint is a constraint on a maximum equivalent isotropic radiated power, EIRP of that direction.

According to yet another aspect, a radio unit 26 configured to interoperate with a digital unit 24 in a network node 16, the network node 16 configured to communicate with a plurality of wireless devices, WDs 22, is provided. The radio unit 26 includes processing circuitry 35 configured to: receive from the digital unit 24 a plurality of directions and at least one power scaling factor, each power scaling factor corresponding to a direction determined by the digital unit 24 to be a direction in which power is to be scaled. For each of a plurality of transmission time intervals, TTIs, and for each of a plurality of directions, the processing circuitry 35 is further configured to estimate a transmission power for the direction; and for each of a plurality of control step intervals and for each of the plurality of directions: estimate a time-average power for the direction based at least in part on an average of a set of estimated transmission power values for the direction during a control step interval; and transmit the time-average power for each direction to the digital unit.

According to this aspect, in some embodiments, the processing circuitry 35 is further configured to: receive an allocation of scheduled resources for each direction of the plurality of directions; and transmit power in each direction of the plurality of directions based at least in part on the allocation of scheduled resources for each direction. In some embodiments, the processing circuitry 35 is further configured to apply one of the at least one power scaling factor to a transmission power in a direction corresponding to the one of the at least one power scaling factor. In some embodiments, the estimation of time average power for a direction is based at least in part on a number of physical resource blocks times a power scaling factor of the at least one power scaling factor. In some embodiments, a control step interval of the plurality of control step intervals exceeds a TTI by a factor of greater than 1000.

According to another aspect, a method in a radio unit 26 configured to interoperate with a digital unit 24 in a network node 16, the network node 16 configured to communicate with a plurality of wireless devices, WDs, 22 is provided. The method includes receiving from the digital unit 24 a plurality of directions and at least one power scaling factor, each power scaling factor corresponding to a direction determined by the digital unit to be a direction in which power is to be scaled. For each of a plurality of transmission time intervals, TTIs, and for each of a plurality of directions, the method includes estimating a transmission power for the direction. For each of a plurality of control step intervals and for each of the plurality of directions, the method includes estimating a time-average power for the direction based at least in part on an average of a set of estimated transmission power values for the direction during a control step interval. The method also includes transmitting the time-average power for each direction to the digital unit 24.

According to this aspect, in some embodiments, the method further includes receiving an allocation of scheduled resources for each direction of the plurality of directions and transmitting power in each direction of the plurality of directions based at least in part on the allocation of scheduled resources for each direction. In some embodiments, the method further includes applying one of the at least one power scaling factor to a transmission power in a direction corresponding to the one of the at least one power scaling factor. In some embodiments, the estimation of time average power for a direction is based at least in part on a number of physical resource blocks times a power scaling factor of the at least one power scaling factor. In some embodiments, a control step interval of the plurality of control step intervals exceeds a TTI by a factor of greater than 1000.

Some abbreviations used herein include the following:

AAS active antenna system
AC antenna calibration
AU antenna unit
BB baseband
DU digital unit
RU radio unit As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A digital unit configured to interoperate with a radio unit in a network node, the network node configured to communicate with a plurality of wireless devices, WDs, the digital unit comprising processing circuitry configured to:

for each of a plurality of transmission time intervals, TTIs, and for each WD of the plurality of WDs, map a transmission intended for the WD to a direction of a sector encompassing the WD;

for each of a plurality of control step intervals and for each of a plurality of directions:

receive an estimated time-average power from the radio unit; and compare the received estimated time-average power to a threshold corresponding to the direction; and apply power scaling during a control step interval, the power scaling being applied to scale a power of transmission in each direction for which the received estimated time-average power exceeds the threshold corresponding to the direction.

2. The digital unit of claim 1, wherein the power scaling includes reducing the power scale of a number of physical resource blocks, PRBs, allocated to transmissions in a direction for which the estimated time-average power exceeds the threshold corresponding to the direction.

3. The digital unit of claim 1, wherein a control step interval of the plurality of control step intervals exceeds a TTI by a factor of greater than 1000.

4. The digital unit of claim 1, wherein each threshold corresponding to a direction is based at least in part on a predefined constraint on a maximum time-average power of transmissions in the direction.

5. The digital unit of claim 4, wherein the constraint is a constraint on a maximum equivalent isotropic radiated power, EIRP, for that particular direction.

6. A method in a digital unit configured to interoperate with a radio unit in a network node, the network node configured to communicate with a plurality of wireless devices, WDs, the method comprising:

for each of a plurality of transmission time intervals, TTIs, and for each WD of the plurality of WDs, mapping a transmission intended for the WD to a direction of a sector encompassing the WD;

for each of a plurality of control step intervals and for each of a plurality of directions:

receiving an estimated time-average power from the radio unit; and comparing the received estimated time-average power to a threshold corresponding to the direction; and applying power scaling during a control step interval, the power scaling being applied to scale a power of transmission in each direction for which the received estimated time-average power exceeds the threshold corresponding to the direction.

7. The method of claim 6, wherein the power scaling includes reducing the power scale of a number of physical resource blocks, PRBs, allocated to transmissions in the direction for which the estimated time-average power exceeds the threshold corresponding to the direction.

8. The method of claim 6, wherein a control step interval of the plurality of control step intervals exceeds a TTI by a factor of greater than 1000.

9. The method of claim 6, wherein each threshold corresponding to a direction is based at least in part on a predefined constraint on a maximum time-averaged power of transmissions in the direction.

10. The method of claim 9, wherein the constraint is a constraint on a maximum equivalent isotropic radiated power, EIRP of that direction.

11. A radio unit configured to interoperate with a digital unit in a network node, the network node configured to communicate with a plurality of wireless devices, WDs, the radio unit comprising processing circuitry configured to: receive from the digital unit a plurality of directions and at least one power scaling factor, each power scaling factor corresponding to a direction determined by the digital unit to be a direction in which power is to be scaled;

for each of a plurality of transmission time intervals, TTIs, and for each of a plurality of directions, estimate a transmission power for the direction;

for each of a plurality of control step intervals and for each of the plurality of directions:

estimate a time-average power for the direction based at least in part on an average of a set of estimated transmission power values for the direction during a control step interval; and transmit the time-average power for each direction to the digital unit.

12. The radio unit of claim 11, wherein the processing circuitry is further configured to:

receive an allocation of scheduled resources for each direction of the plurality of directions; and transmit power in each direction of the plurality of directions based at least in part on the allocation of scheduled resources for each direction.

13. The radio unit of claim 11, wherein the processing circuitry is further configured to apply one of the at least one power scaling factor to a transmission power in a direction corresponding to the one of the at least one power scaling factor.

14. The radio unit of claim 11, wherein the estimation of time average power for a direction is based at least in part on a number of physical resource blocks times a power scaling factor of the at least one power scaling factor.

15. The radio unit of claim 11, wherein a control step interval of the plurality of control step intervals exceeds a TTI by a factor of greater than 1000.

16. A method in a radio unit configured to interoperate with a digital unit in a network node, the network node configured to communicate with a plurality of wireless devices, WDs, the method comprising:

receiving from the digital unit a plurality of directions and at least one power scaling factor, each power scaling factor corresponding to a direction determined by the digital unit to be a direction in which power is to be scaled;

for each of a plurality of transmission time intervals, TTIs, and for each of a plurality of directions, estimating a transmission power for the direction;

for each of a plurality of control step intervals and for each of the plurality of directions:

estimating a time-average power for the direction based at least in part on an average of a set of estimated transmission power values for the direction during a control step interval; and transmitting the time-average power for each direction to the digital unit.

17. The method of claim 16, further comprising:

receiving an allocation of scheduled resources for each direction of the plurality of directions; and transmitting power in each direction of the plurality of directions based at least in part on the allocation of scheduled resources for each direction.

18. The method of claim 16, further comprising applying one of the at least one power scaling factor to a transmission power in a direction corresponding to the one of the at least one power scaling factor.

19. The method of claim 16, wherein the estimation of time average power for a direction is based at least in part on a number of physical resource blocks times a power scaling factor of the at least one power scaling factor.

20. The method of claim 16, wherein a control step interval of the plurality of control step intervals exceeds a TTI by a factor of greater than 1000.

* * * * *